US008205449B2

(12) United States Patent
Mondori et al.

(10) Patent No.: US 8,205,449 B2
(45) Date of Patent: Jun. 26, 2012

(54) INTERNAL COMBUSTION ENGINE AND CONTROL SYSTEM FOR INTERNAL COMBUSTION ENGINE

(75) Inventors: Fumihiro Mondori, Wako (JP); Naohiro Sato, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 278 days.

(21) Appl. No.: 12/301,663

(22) PCT Filed: Feb. 13, 2008

(86) PCT No.: PCT/JP2008/052280
§ 371 (c)(1), (2), (4) Date: Nov. 20, 2008

(87) PCT Pub. No.: WO2008/108141
PCT Pub. Date: Sep. 12, 2008

(65) Prior Publication Data

US 2010/0064686 A1 Mar. 18, 2010

(30) Foreign Application Priority Data

Mar. 2, 2007 (JP) ................................ 2007-052696
Aug. 21, 2007 (JP) ................................ 2007-214417

(51) Int. Cl.
*F02B 33/44* (2006.01)

(52) U.S. Cl. ...................................................... 60/605.2
(58) Field of Classification Search .................. 60/605.2
See application file for complete search history.

(56) References Cited

U.S. PATENT DOCUMENTS 6,519,931 B2 * 2/2003 Fujieda et al. .................. 60/280
6,675,579 B1 * 1/2004 Yang .............................. 60/599
6,823,660 B2 * 11/2004 Minami .......................... 60/280
6,865,882 B2 * 3/2005 Minami .......................... 60/295
2003/0213232 A1 * 11/2003 Brisley et al. .................. 60/285
2004/0103651 A1 * 6/2004 Bennett et al. .................. 60/286
2005/0042151 A1 * 2/2005 Alward et al. ................ 422/177
2005/0188680 A1 * 9/2005 Ueda et al. ...................... 60/277
2006/0021346 A1 * 2/2006 Whelan et al. .............. 60/605.2
2006/0211569 A1 * 9/2006 Dang et al. ...................... 502/60

FOREIGN PATENT DOCUMENTS

JP 03-074561 A 3/1991
JP 09-209742 A 8/1997
JP 11-229973 A 8/1999
JP 2002-349241 A 12/2002
JP 2004-19624 A 1/2004
JP 2005-171932 A 6/2005
JP 2006-46288 A 2/2006
JP 2006-046288 A 2/2006
JP 2006-220046 A 8/2006

* cited by examiner

*Primary Examiner* — Thomas Denion
*Assistant Examiner* — Cameron Setayesh
(74) *Attorney, Agent, or Firm* — Arent Fox LLP

(57) ABSTRACT

An internal combustion engine having a turbocharger is provided. The engine includes a turbine of the turbocharger located in an exhaust system of the engine, an upstream side catalyst located upstream of the turbine, a catalyst bypass passage bypassing the upstream side catalyst, a catalyst bypass passage on/off valve for opening and closing the catalyst bypass passage, and a first exhaust gas recirculation passage for recirculating a part of exhaust gases from a portion between the upstream side catalyst and the turbine to an intake system of the engine. The engine, that further includes a second exhaust gas recirculation passage for recirculating a part of exhaust gases from an upstream side of the upstream side catalyst to the intake system, and a switching valve for switching between the first exhaust recirculation passage and the second exhaust recirculation passage, is provided.

18 Claims, 7 Drawing Sheets

INTERNAL COMBUSTION ENGINE
INJ
ECU
AP
TW
NE

[FIG. 1]
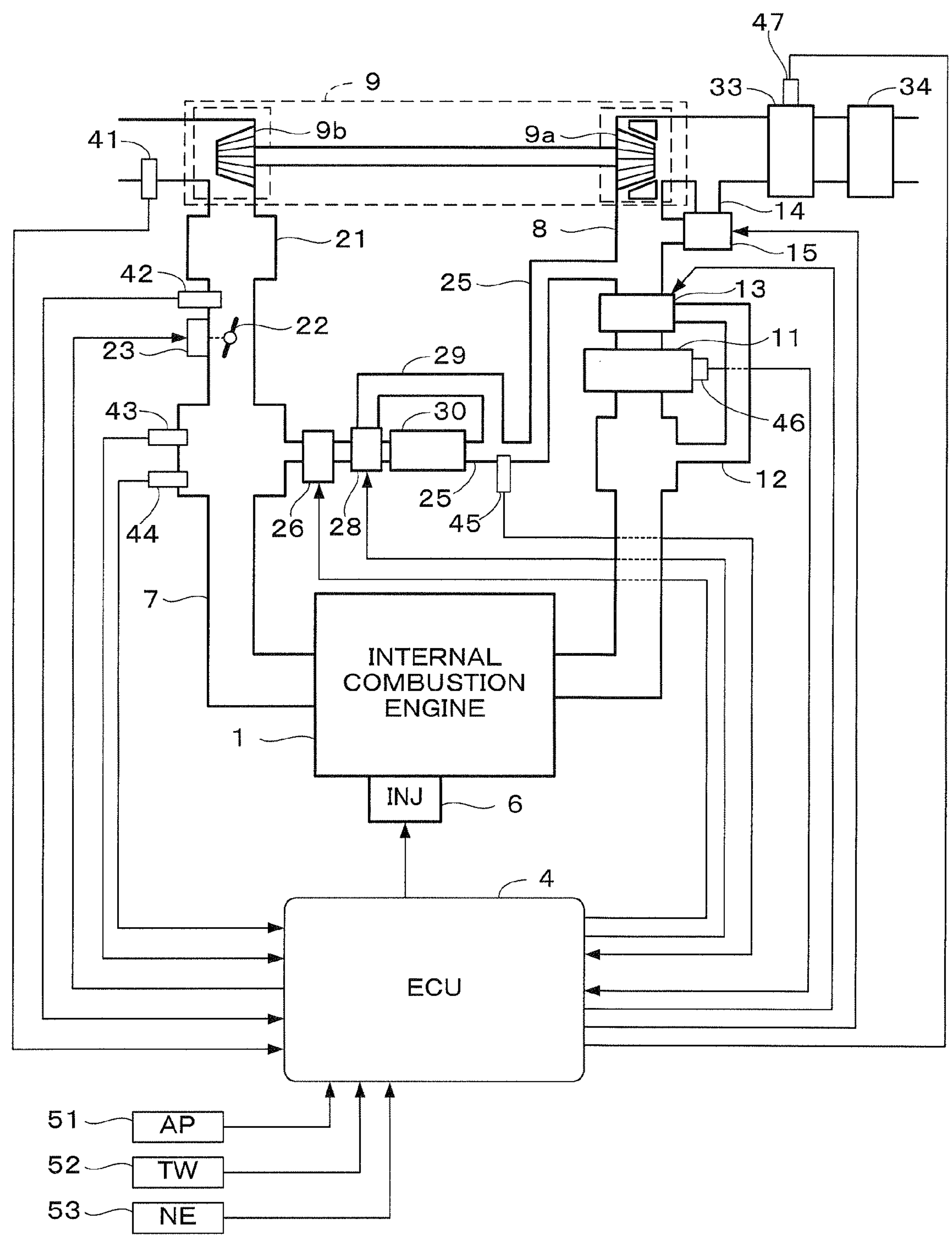

[FIG. 2]
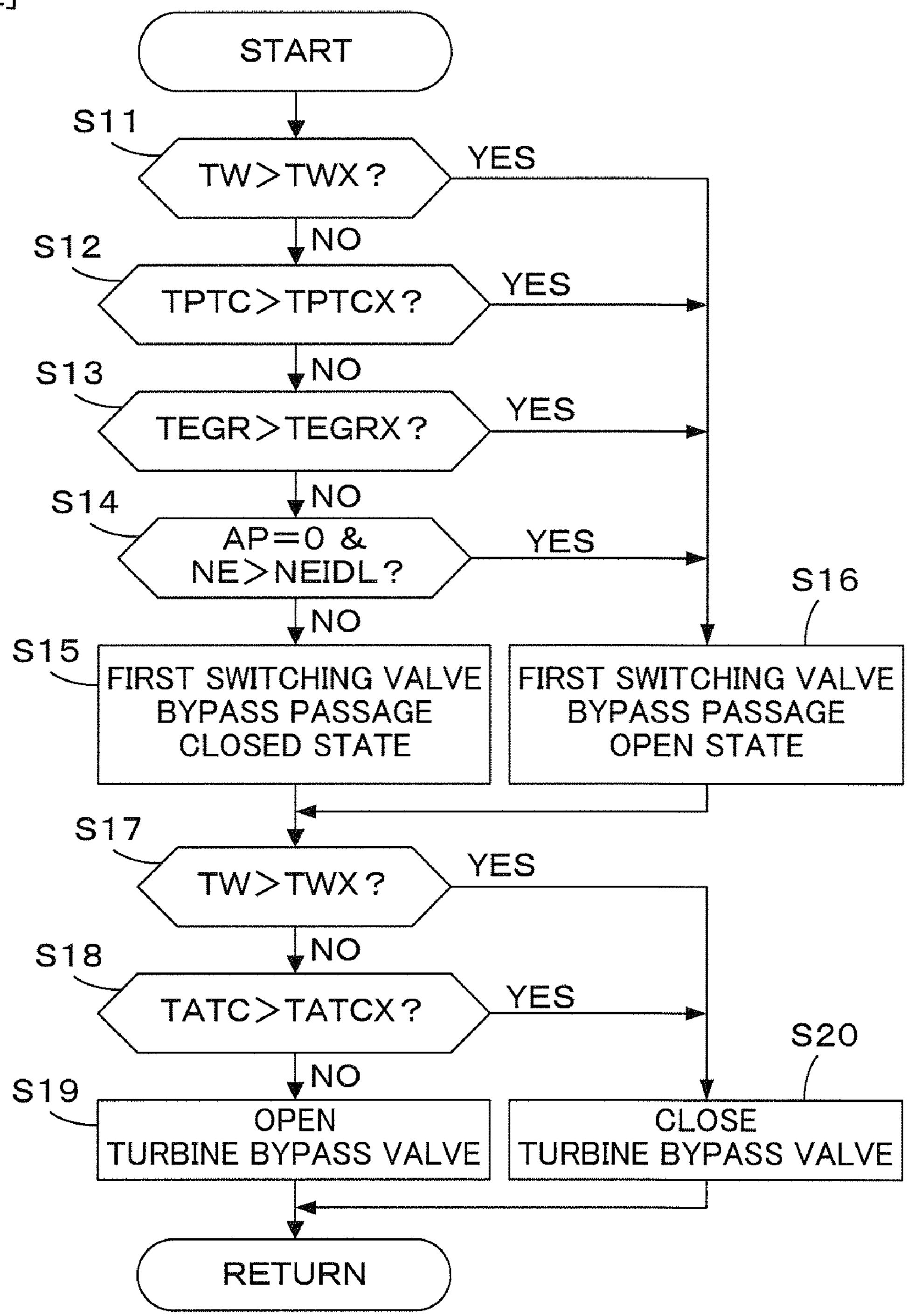

[FIG. 3]
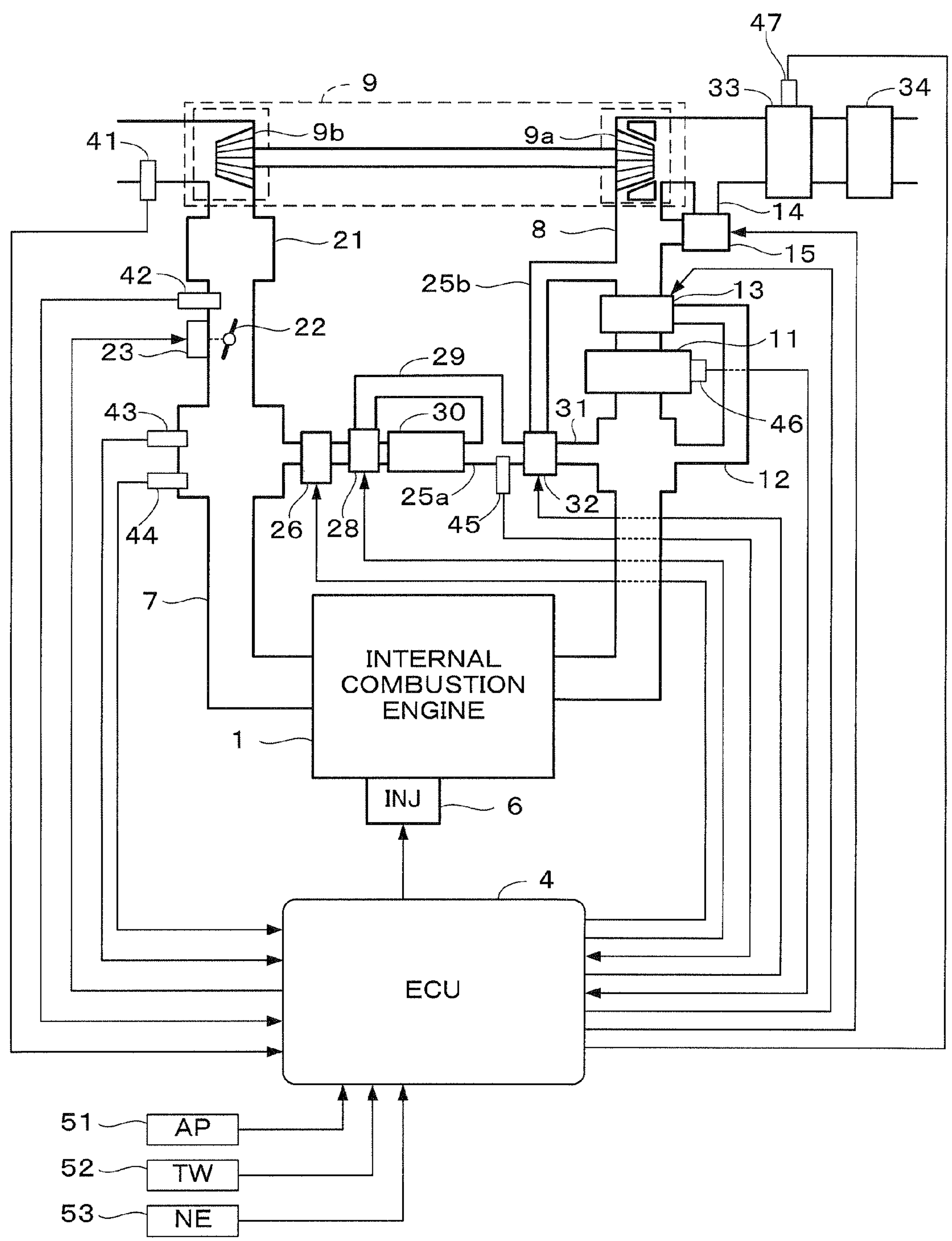

[FIG. 4]
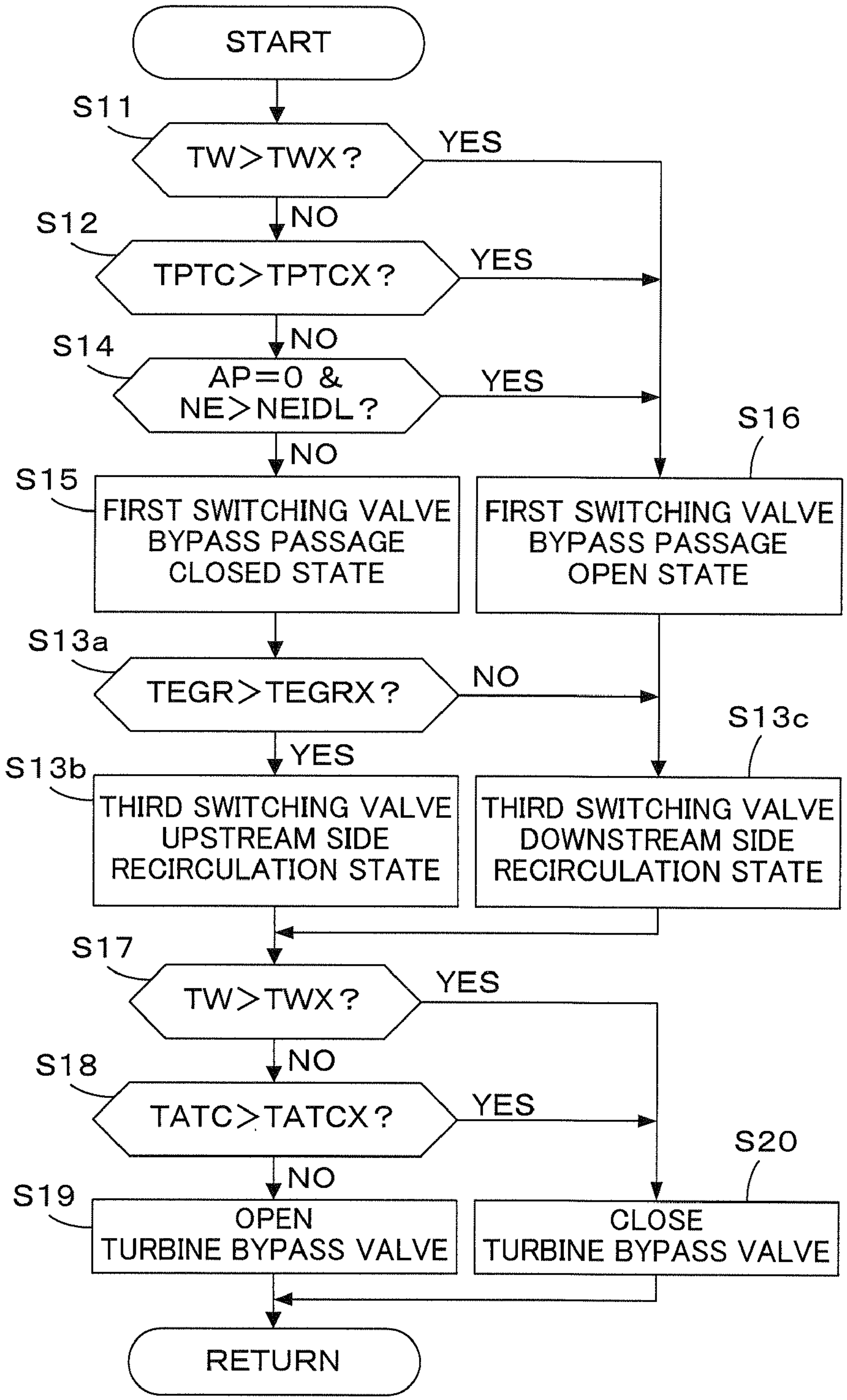

[FIG. 5]
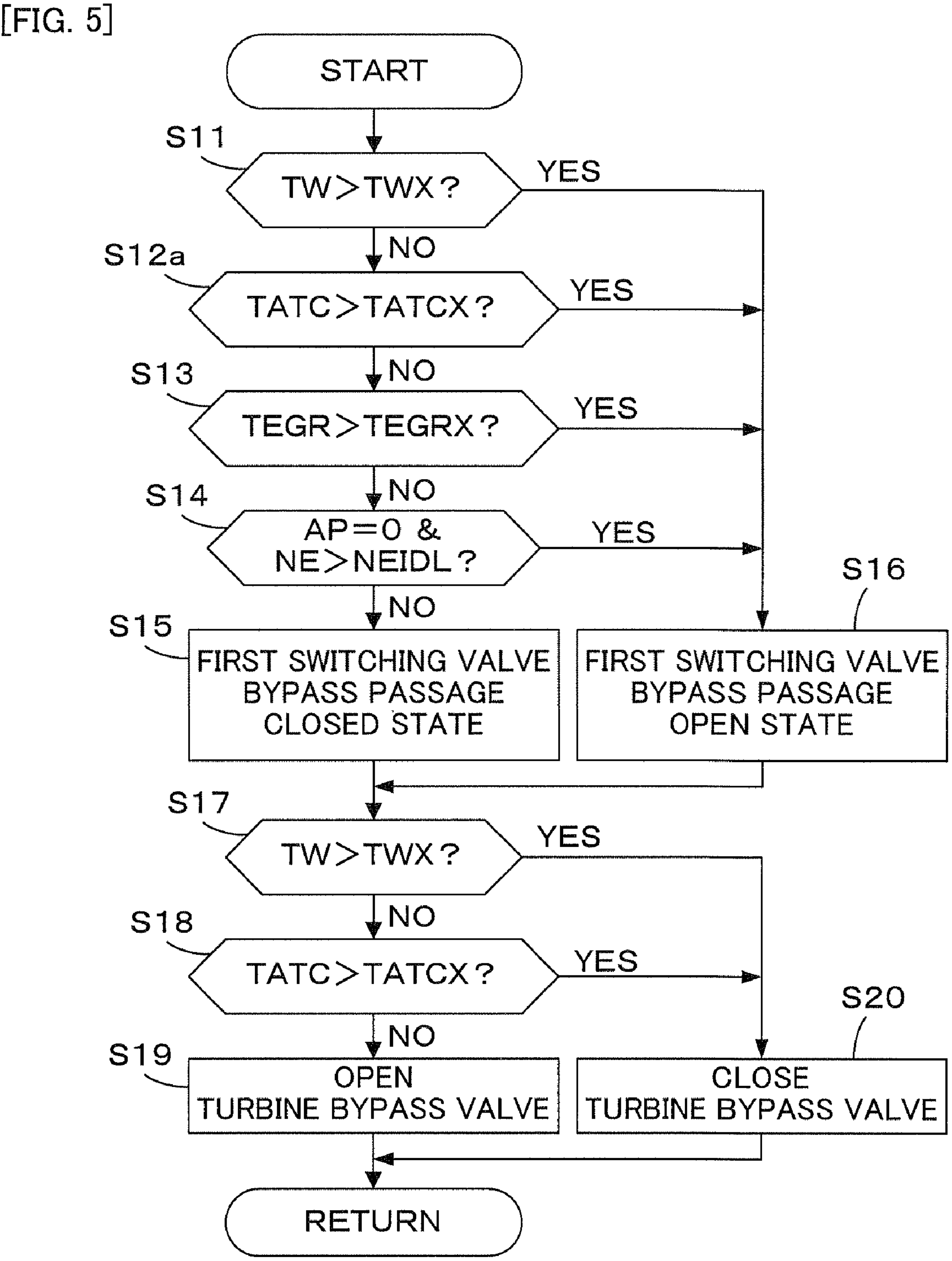

[FIG. 6]
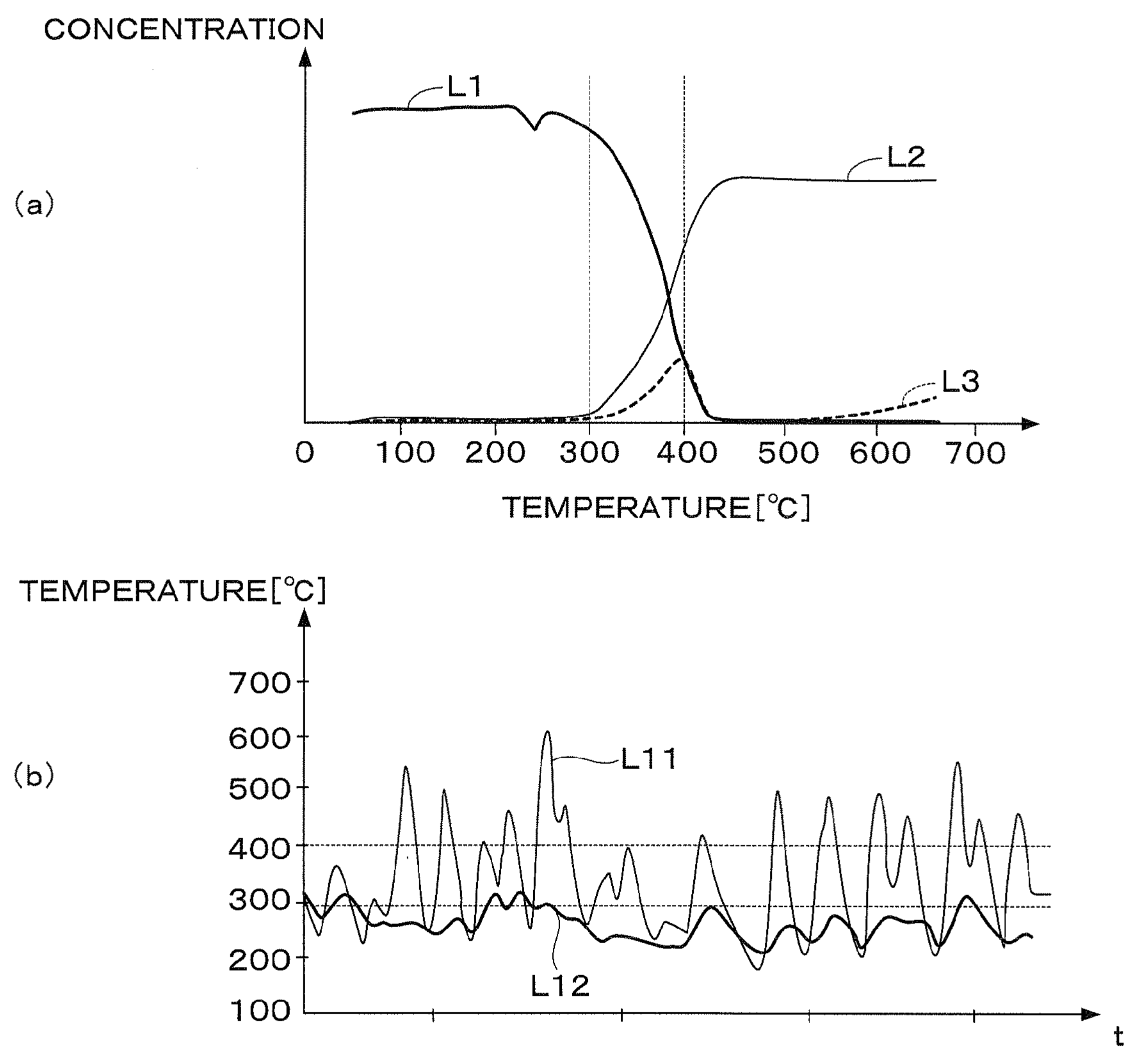

[FIG. 7]
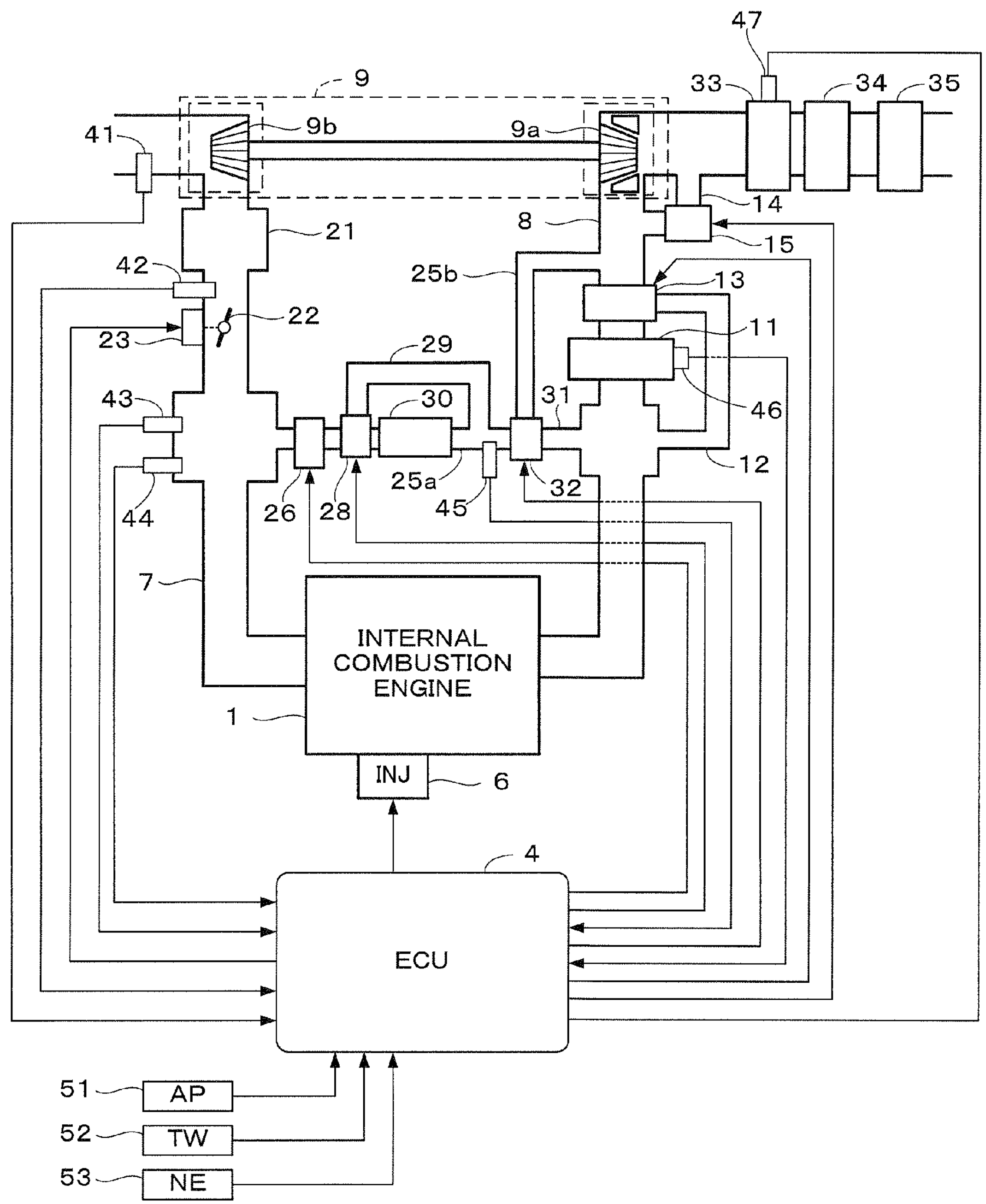

INTERNAL COMBUSTION ENGINE AND CONTROL SYSTEM FOR INTERNAL COMBUSTION ENGINE

TECHNICAL FIELD

This application is a National Stage entry of International Application No. PCT/JP2008/52280, filed Feb. 13, 2008, the entire specification and claims of which are incorporated herewith by reference.

The present invention relates to an internal combustion engine having a turbocharger and catalysts for purifying exhaust gases, and a control system for the internal combustion engine.

BACKGROUND ART

The patent document 1 discloses an exhaust gas purifying apparatus for an internal combustion engine having a turbocharger. In the internal combustion engine, a catalyst for purifying exhaust gases is disposed upstream of a turbine of the turbocharger in an exhaust passage of the engine, and a bypass passage bypassing the catalyst is provided. Normally, the exhaust gases passing through the catalyst are supplied to the turbine. Upon rapid acceleration of the engine, the exhaust gases passing through the bypass passage are supplied to the turbine. According to the apparatus, the exhaust gases passing through the catalyst are supplied to the turbine in the state where an exhaust gas temperature is low, thereby maintaining good exhaust characteristics. Upon rapid acceleration of the engine, the exhaust gases bypassing the catalyst are supplied to the turbine, thereby preventing drivability of the engine from deteriorating.

Patent Document 1: Japanese Patent Laid-open No. 2005-171932

DISCLOSURE OF THE INVENTION

Problems to be Solved by the Invention

In the apparatus disclosed in the patent document 1, the exhaust gas recirculation passage is provided between an upstream side of the catalyst and the intake system of the engine. Accordingly, the exhaust gas temperature is low before completion of the warming-up of the engine, and a temperature of the recirculated exhaust gases is also low. Consequently, a time period necessary for completing the warming-up tends to become long. Further, when the engine is accelerated before completion of the warming-up of the engine, there is a possibility that unburnt fuel components adhere to the exhaust gas recirculation passage or the exhaust gas recirculation control valve, which may reduce an effective cross section area of the exhaust gas recirculation passage and/or cause sticking of the exhaust gas recirculation control valve.

The present invention was made contemplating this point, and a first object of the present invention is to provide an internal combustion engine, which can prevent the unburnt fuel components from flowing into the exhaust gas recirculation passage and raise a temperature of the exhaust gases recirculated to the intake system before completion of the warming-up of the engine.

Further, a second object of the present invention is to provide a control system for an internal combustion engine which appropriately changes flowing passages of the exhaust gases recirculated to the intake system, thereby obtaining good exhaust characteristics of the engine.

Means for Solving the Problems

To attain the first object, the present invention provides an internal combustion engine having a turbocharger (9). The internal combustion engine is characterized by including a turbine (9*a*) of the turbocharger located in an exhaust system (8) of the engine, the upstream side catalyst (11) located upstream of the turbine (9*a*), a catalyst bypass passage (12) bypassing the upstream side catalyst (11), a catalyst bypass passage on/off valve (13) for opening and closing the catalyst bypass passage (12), and an exhaust gas recirculation passage (25) for recirculating a part of exhaust gases from a portion between the upstream side catalyst (11) and the turbine (9*a*) to an intake system (7) of the engine.

With this configuration, the exhaust gases discharged from the engine passes through the upstream side catalyst in a state where the catalyst bypass passage on/off valve is closed, and a part of exhaust gases discharged from the upstream side catalyst is recirculated to the intake system through the exhaust gas recirculation passage. Further, the remaining most part of the exhaust gases is supplied to the turbine. Before completion of the warming-up of the engine, unburnt fuel components burn in the upstream side catalyst to raise the temperature of the exhaust gases by closing the catalyst bypass passage on/off valve, and the exhaust gases of the raised temperature is recirculated to the intake system. Consequently, the warming-up of the engine is accelerated and the unburnt fuel components are prevented from flowing into the exhaust gas recirculation passage, which makes it possible to avoid reduction of the effective cross section area of the exhaust gas recirculation passage or sticking of the exhaust gas recirculation control valve. Further, after completion of the warming-up of the engine, thermal deterioration and increase in the pressure loss of the upstream side catalyst are suppressed by opening the catalyst bypass passage on/off valve, thereby preventing the temperature of the recirculated exhaust gases from becoming too high.

Further, the present invention provides an internal combustion engine having a turbocharger (9). The internal combustion engine is characterized by including a turbine (9*a*) of the turbocharger in an exhaust system (8) of the engine, a upstream side catalyst (11) disposed upstream side of the turbine (9*a*), a catalyst bypass passage (12) bypassing the upstream side catalyst (11), a catalyst bypass passage on/off valve (13) for opening and closing the catalyst bypass passage (12), a first exhaust gas recirculation passage (25*a*, 25*b*) for recirculating a part of exhaust gases from a portion between the upstream side catalyst (11) and the turbines (9*a*) to an intake system (7) of the engine, a second exhaust gas recirculation passage (31, 25*a*) for recirculating a part of exhaust gases from an upstream side of the upstream side catalyst (11) to the intake system, and a switching valve (32) for switching between the first exhaust gas recirculation passage and the second exhaust gas recirculation passage.

With this configuration, in the state where the catalyst bypass passage on/off valve is closed and the switching valve is switched to the state of connecting the first exhaust gas recirculation passage, the exhaust gases discharged from the engine passes through the upstream side catalyst, and a part of exhaust gases discharged from the upstream side catalyst is recirculated through the first exhaust gas recirculation passage to the intake system, while the remaining most part of the exhaust gases is supplied to the turbine. Before completion of the warming-up of the engine, the unburnt fuel components burn in the upstream side catalyst to raise the temperature of the exhaust gases by closing the catalyst bypass passage on/off valve, and the exhaust gases of the raised temperature is recirculated to the intake system. Consequently, the warming-up of the engine is accelerated and the unburnt fuel components are prevented form flowing into the exhaust gas recirculation passage, which makes it possible to avoid reduction of the effective cross section area of the exhaust gas recirculation passage or sticking of the exhaust gas recirculation control valve. Further, after completion of the warming-up of the engine, thermal deterioration and increase in the pressure loss of the upstream side catalyst are suppressed by opening the catalyst bypass passage on/off valve, thereby preventing the temperature of the recirculated exhaust gases from becoming too high. Further, in the state where the catalyst bypass passage on/off valve is closed, by switching the switching valve to the state of connecting the second exhaust gas recirculation passage side at the time the temperature of the recirculated exhaust gases rises to a comparatively high level, the temperature of the recirculated exhaust gases is prevented from becoming too high while purifying the exhaust gases with the upstream side catalyst.

Preferably, the internal combustion engine further includes a downstream side catalyst (33) disposed downstream of the turbine (9*a*). With this configuration, the exhaust gases can be certainly purified also in the state where the catalyst bypass passage on/off valve is opened (the state where the exhaust gases bypass the upstream side catalyst).

Preferably, the internal combustion engine further includes a turbine bypass passage (14) bypassing the turbine (9*a*) and a turbine bypass passage on/off valve (15) for opening and closing the turbine bypass passage (14), wherein the downstream side catalyst (33) is located downstream of a connecting portion at which the exhaust passage (8) and the turbine bypass passage (14) are connected downstream of the turbine (9*a*).

With this configuration, the exhaust gases bypass the turbine and flow into the downstream side catalyst by opening the turbine bypass passage on/off valve during the warming-up of the engine. Consequently, rise in the temperature of the downstream side catalyst is accelerated, and activation of the downstream side catalyst can be completed earlier.

Preferably, the internal combustion engine further includes a particulate filter (34) disposed downstream of the downstream side catalyst (33). With this configuration, activation of the downstream side catalyst can be completed earlier compared with a case where the particulate filter is disposed upstream of the downstream side catalyst.

Preferably, the internal combustion engine further includes a lean NOx catalyst (35) disposed downstream of the particulate filter (34). With this configuration, when performing the regeneration of the particulate filter, rise in the temperature of the particulate filter can be accelerated and thermal deterioration of the lean NOx catalyst can be suppressed.

Preferably, the downstream side catalyst (33) is a three-way catalyst added with a NOx trapping agent or an oxidation catalyst added with a hydrocarbon adsorbent. By employing the configuration with the three-way catalyst added with the NOx trapping agent, the downstream side catalyst traps NOx to secure a high NOx trapping rate even if the upstream side catalyst does not sufficiently trap NOx in a high-load operating condition of the engine. Further, according to the configuration with the oxidation catalyst added with the hydrocarbon adsorbent, oxidation of hydrocarbon and CO can be accelerated by making exhaust gases bypass the upstream side catalyst to directly flow into the downstream side catalyst when the exhaust gas temperature is high.

Preferably, the upstream side catalyst (11) is any one of an oxidation catalyst added with a hydrocarbon adsorbent, a three-way catalyst added with a NOx trapping agent, and a three-way catalyst added with a NOx trapping agent and a hydrocarbon adsorbent.

By adding the NOx trapping agent to the upstream side catalyst, NOx can be trapped immediately after starting of the engine, and the trapped NOx can be reduced by enriching the air-fuel ratio. Further, by adding the hydrocarbon adsorbent, hydrocarbon is adsorbed immediately after starting of the engine, thereby significantly reducing an emission amount of hydrocarbon.

Preferably, the NOx trapping agent is ceria, and the hydrocarbon adsorbent is zeolite. By using ceria as the NOx trapping agent, NOx can be trapped at a lower temperature compared with the case that alkali metal or the like is used. Further, by using zeolite as the hydrocarbon adsorbent, sufficient adsorbing capability can be obtained when the temperature of exhaust gases is high.

To attain the second object, the present invention provides a control system for an internal combustion engine including a turbo charger (9), a turbine (9*a*) of the turbocharger in an exhaust system (8) of the engine, a upstream side catalyst (11) disposed upstream side of the turbine (9*a*), a catalyst bypass passage (12) bypassing the upstream side catalyst (11), a catalyst bypass passage on/off valve (13) for opening and closing the catalyst bypass passage (12), a first exhaust gas recirculation passage (25*a*, 25*b*) for recirculating a part of exhaust gases from a portion between the upstream side catalyst (11) and the turbines (9*a*) to an intake system (7) of the engine, a second exhaust gas recirculation passage (31, 25*a*) for recirculating a part of exhaust gases from an upstream side of the upstream side catalyst (11) to the intake system, a switching valve (32) for switching between the first exhaust gas recirculation passage and the second exhaust gas recirculation passage. The control system is characterized by closing the catalyst bypass passage on/off valve (13) and switching the switching valve (32) to a state of connecting the first exhaust gas recirculation passage (25*a*, 25*b*) when a temperature (TW) of the engine is low, wherein the switching valve (32) is switched to the other state of connecting the second exhaust gas recirculation passage (31, 25*a*), when a temperature (TEGR) of exhaust gases recirculated through the first exhaust gas recirculation passage exceeds a predetermined exhaust gas temperature (TEGRX).

With this configuration, when the temperature of the engine is low, the catalyst bypass passage on/off valve is closed, and the switching valve is switched to the state of connecting the first exhaust gas recirculation passage, wherein if the temperature of exhaust gases recirculated through the first exhaust gas recirculation passage exceeds the predetermined exhaust gas temperature, the switching valve is switched to the state of connecting the second exhaust gas recirculation passage. In the state where the catalyst bypass passage on/off valve is closed and the switching valve is switched to the state of connecting the first exhaust gas recirculation passage, the exhaust gases discharged from the engine passes through the upstream side catalyst, and a part of exhaust gases discharged from the upstream side catalyst is recirculated through the first exhaust gas recirculation passage to the intake system. Accordingly, when the temperature of the engine is low before completion of the warming-up of the engine, the catalyst bypass passage on/off valve is closed. Therefore, the unburnt fuel components burn in the upstream side catalyst to raise the temperature of the exhaust gases by closing the catalyst bypass passage on/off valve, and the exhaust gases of the raised temperature is recirculated to the intake system. Consequently, the warming-up of the engine is accelerated and the unburnt fuel components are prevented form flowing into the exhaust gas recirculation passage, which makes it possible to avoid reduction of the effective cross section area of the exhaust gas recirculation passage or sticking of the exhaust gas recirculation control valve. Further, in the state where the catalyst bypass passage on/off valve is closed, the switching valve is switched to the state of connecting the second exhaust gas recirculation passage side if the temperature of the recirculated exhaust gases exceeds the predetermined exhaust gas temperature. Therefore, the temperature of the recirculated exhaust gases is prevented from becoming too high while purifying the exhaust gases with the upstream side catalyst. Consequently, good exhaust characteristic can be obtained.

Preferable, the catalyst bypass passage on/off valve (13) is closed when the temperature (TW) of the engine is low.

With this configuration, the exhaust gases discharged from the engine passes through the upstream side catalyst, and a part of the exhaust gases discharged from the upstream side catalyst is recirculated through the exhaust gas recirculation passage to the intake system, while the remaining most part of the exhaust gases is supplied to the turbine. Therefore, the unburnt fuel components burn in the upstream side catalyst to raise the temperature of the exhaust gases, and the exhaust gases of the raised temperature is recirculated to the intake system. Consequently, the warming-up of the engine is accelerated and the unburnt fuel components are prevented from flowing into the exhaust gas recirculation passage, which makes it possible to avoid reduction of the effective cross section area of the exhaust gas recirculation passage or sticking of the exhaust gas recirculation control valve.

Preferably, the catalyst bypass passage on/off valve (13) is closed when a temperature (TPTC) of the upstream side catalyst is equal to or less than a predetermined catalyst temperature (TPTCX).

With this configuration, the exhaust gases discharged from the engine pass through the upstream side catalyst and the unburnt fuel components burn in the upstream side catalyst, which makes it possible to promptly raise the temperature of the catalyst.

Preferably, the catalyst bypass passage on/off valve (13) is opened when the engine is decelerating (AP=0, NE>NEIDL). During deceleration of the engine, the fuel supply to the engine is normally stopped and the temperature of gases discharged from the combustion chamber is low. Therefore, by making the exhaust gases bypass the upstream side catalyst, reduction in the temperature of the upstream catalyst can be prevented.

BRIEF DESCRIPTION OF THE DRAWINGS

FIG. 1 shows a configuration of an internal combustion engine and a control system therefor according to a first embodiment of the present invention.

FIG. 2 is a flowchart of a process for controlling a first switching valve (13) and a turbine bypass valve (15) shown in FIG. 1.

FIG. 3 shows a configuration of an internal combustion engine and a control system therefor according to a second embodiment of the present invention.

FIG. 4 is a flowchart of a process for controlling a first switching valve (13), a third switching valve (32), and a turbine bypass valve (15) shown in FIG. 3.

FIG. 5 is a flowchart showing a modification of the process shown in FIG. 2.

FIG. 6 is a diagram for illustrating the steam reforming reaction in a three-way catalyst.

FIG. 7 shows a configuration of an internal combustion engine and a control system therefor according to a third embodiment of the present invention.

DESCRIPTION OF REFERENCE NUMERALS

1 Internal Combustion Engine
4 Electronic Control Unit
7 Intake Pipe (Intake System)
8 Exhaust Pipe (Exhaust Passage)
9 Turbo Charger (Turbo Charger)
**9*a*** Turbine
11 Upstream Side Catalyst
12 Catalyst Bypass Passage
13 First Switching Valve (Catalyst Bypass Passage On/Off Valve)
14 Turbine Bypass Passage
15 Turbine Bypass Valve (Turbine Bypass Passage On/Off Valve)
25 Exhaust Gas Recirculation Passage
**25*a*** Common Exhaust Gas Recirculation Passage
**25*b*** Downstream Connecting Exhaust Gas Recirculation Passage
31 Upstream Connecting Exhaust Gas Recirculation Passage
32 Third Switching Valve
33 Downstream Side Catalyst
34 Particulate Filter
35 Lean NOx Catalyst

BEST MODE FOR CARRYING OUT THE INVENTION

Preferred embodiments of the present invention will now be described with reference to the drawings.

First Embodiment

FIG. 1 is a schematic diagram showing a configuration of an internal combustion engine and a control system therefor according to one embodiment of the present invention. The internal combustion engine 1 (hereinafter referred to as "engine") is a diesel engine wherein fuel is injected directly into cylinders. Each cylinder is provided with a fuel injection valve 6 that is electrically connected to an electronic control unit (hereinafter referred to as "ECU 4"). The ECU 4 controls a valve opening period and a valve opening timing of each fuel injection valve 6.

The engine 1 has an intake pipe 7, an exhaust pipe 8, and a turbocharger 9. The turbocharger 9 includes a turbine **9*a* and a compressor 9*b*. The turbine 9*a* is rotationally driven by the kinetic energy of exhaust gases. The compressor 9*b* is connected to the turbine 9*a* via a shaft. The turbocharger 9 pressurizes (compresses) the intake air of the engine 1. A turbine bypass passage 14 bypassing the turbine 9*a* is connected to the exhaust pipe 8, and a turbine bypass valve 15 is provided in the turbine bypass passage 14. The turbine bypass valve 15 is connected to the ECU 4 and opening and closing of the turbine bypass valve 15 is controlled by the ECU 4**.

The intake pipe 7 is provided with an intercooler 21 downstream of the compressor, and further provided with a throttle valve 22 downstream of the intercooler 21. The throttle valve 22 is configured to be actuated to open and close by an actuator 23, and the actuator 23 is connected to the ECU 4. The ECU 4 controls an opening of the throttle valve 22 through the actuator 23.

The exhaust pipe 8 is provided with an upstream side catalyst 11 for purifying exhaust gases. A catalyst bypass passage 12 bypassing the upstream side catalyst 11 is connected to the exhaust pipe 8. An oxidation catalyst containing zeolite as an HC adsorbent and platinum, or a three-way catalyst containing ceria having NOx adsorbability is used as the upstream side catalyst 11.

Alternatively, the upstream side catalyst 11 may consists of a carrier made of alumina carrying platinum (Pt) and palladium (Pd), and a three-way catalyst which contains ceria as a NOx trapping agent, rhodium (Rh), and zeolite as the HC adsorbent. Rhodium (Rh) is added for accelerating the steam reforming reaction of HC in the reducing state wherein the concentration of HC (hydrocarbon) in exhaust gases is comparatively high. The steam reforming reaction is a reaction in which hydrocarbon and steam react to generate hydrogen and carbon monoxide, and the generated carbon monoxide further reacts with steam to generate hydrogen and carbon dioxide.

By adding the NOx trapping agent to the upstream side catalyst 11, NOx can be trapped immediately after starting of the engine and the trapped NOx can be reduced by enriching the air-fuel ratio. Further, by adding the HC adsorbent to the upstream side catalyst 11, hydrocarbon is adsorbed immediately after starting of the engine, which makes it possible to significantly reduce the emission amount of hydrocarbon. Further, by using ceria as the NOx trapping agent, NOx can be trapped at a lower temperature compared with a case where alkali metal or the like is used as the NOx trapping agent. Further, by using zeolite as the HC adsorbent, sufficient adsorbing capacity can be obtained when the temperature of the exhaust gases is high.

A first switching valve 13 is disposed at a connecting portion between the catalyst bypass passage 12 and the exhaust pipe 8. The first switching valve 13 is connected to the ECU 4, and the operation of the first switching valve 13 is controlled by the ECU4. The first switching valve 13 is switched between a state where the exhaust gases are supplied to the turbine 9*a* through the catalyst bypass passage 12 (hereinafter referred to as "bypass passage open state"), and a state where the exhaust gases are supplied to the turbine 9*a* through the upstream side catalyst 11 (hereinafter referred to as "bypass passage closed state").

An exhaust gas recirculation passage 25 is provided between the downstream side of the exhaust pipe 8 relative to the switching valve 13 and the downstream side of the intake pipe 7 relative to the throttle valve 22. The exhaust gas recirculation passage 25 recirculates a part of exhaust gases to the intake pipe 7. The exhaust gas recirculation passage 25 is provided with a recirculated exhaust gas cooler 30, a second switching valve 28, and an exhaust gas recirculation control valve (hereinafter referred to as "EGR valve") 26, and a bypass passage 29 bypassing the recirculated exhaust gas cooler 30 is connected to the exhaust gas recirculation passage 25. The recirculated exhaust gas cooler 30 cools the recirculated exhaust gases. The second switching valve 28 switches between a state of connecting the recirculated exhaust gas cooler 30 and a state of connecting the bypass passage 29. The exhaust gas recirculation control valve controls an amount of the recirculated exhaust gases. The EGR valve 26 is an electromagnetic valve having a solenoid. A valve opening of the EGR valve 26 is controlled by the ECU 4. The exhaust gas recirculation passage 25, the recirculated exhaust gas cooler 30, the bypass passage 29, the second switching valve 28, and the EGR valve 26 constitute an exhaust gas recirculation mechanism.

An intake air flow rate sensor 41, a boost pressure sensor 42, an intake pressure sensor 43, and an intake air temperature sensor 44 are disposed in the intake pipe 7. The intake air flow rate sensor 41 detects an intake air flow rate GA. The boost pressure sensor 42 detects an intake pressure (boost pressure) PB in the intake pipe 7 downstream of the compressor 9*b*. The intake pressure sensor 43 detects an intake pressure PI. The intake air temperature sensor 44 detects an intake air temperature TI. These sensors 41 to 44 are connected to the ECU 4, and the detection signals from the sensors 41 to 44 are supplied to the ECU 4.

A downstream side catalyst 33 and a particulate filter (hereinafter referred to as "DPF") 34 are disposed downstream of the turbine 9*a* in the exhaust pipe 8 (downstream of the connecting portion of the exhaust pipe 8 and the turbine bypass passage 14). The downstream side catalyst 33 accelerates oxidation of hydrocarbon and the like in exhaust gases. The particulate filter 34 traps particulate matter (which mainly consists of soot).

The downstream side catalyst 33 consists of a carrier made of alumina carrying platinum (Pt), palladium (Pd), and rhodium (Rh), and a three-way catalyst to which ceria is added as the NOx trapping agent. Alternatively, the downstream side catalyst 33 may consists of a carrier made of alumina carrying platinum (Pt) and palladium (Pd), and an oxidation catalyst to which zeolite is added as the HC adsorbent.

By disposing the DPF 34 downstream of the downstream side catalyst 33, activation of the downstream side catalyst 33 can be accelerated compared with a case where the DPF 34 is disposed upstream of the downstream side catalyst 33.

Further, by configuring the downstream side catalyst 33 with the three-way catalyst to which the NOx trapping agent is added, the downstream side catalyst 33 traps NOx even if the upstream side catalyst 11 does not sufficiently trap NOx in the high-load operating condition of the engine, which makes it possible to secure a high NOx trapping rate. Further, by configuring the downstream side catalyst 33 with the oxidation catalyst added which the HC adsorbent, and supplying the exhaust gases to the downstream side catalyst 33 bypassing the upstream side catalyst 11 when the exhaust gas temperature is high, oxidation of hydrocarbon and CO can be accelerated.

A recirculated exhaust gas temperature sensor 45 for detecting a temperature of the recirculated exhaust gases (hereinafter referred to as "recirculated exhaust gas temperature") TEGR is disposed in the exhaust gas recirculation passage 25. An upstream side catalyst temperature sensor 46 and a downstream side catalyst temperature sensor 47 are respectively disposed in the upstream side catalyst 11 and the downstream side catalyst 33 for detecting temperatures thereof (hereinafter refereed to as "upstream side catalyst temperature TPTC" and "downstream side catalyst temperature TATC"). The detection signals of these temperature sensors 45 to 47 are supplied to the ECU 4.

An accelerator sensor 51 for detecting an operation amount AP of the accelerator pedal of the vehicle driven by the engine 1, a coolant temperature sensor 52 for detecting a coolant temperature TW of the engine 1, and an engine rotational speed sensor 53 for detecting an engine rotational speed NE are connected to the ECU 4. The detection signals of these sensors are supplied to the ECU 4.

The ECU 4 is connected to the fuel injection valve 6 provided in the combustion chamber of each cylinder of the engine 1, and provides a drive signal to each fuel injection valve 6.

The ECU 4 includes an input circuit, a central processing unit (hereinafter referred to as "CPU"), a memory circuit, and an output circuit. The input circuit performs various functions, including shaping the waveforms of input signals from various sensors, correcting the voltage levels of the input signals to a predetermined level, and converting analog signal values into digital values. The memory circuit preliminarily stores various operating programs to be executed by the CPU and stores the results of computations or the like by the CPU. The output circuit supplies control signals to the fuel injection valves 6, the EGR valve 26, the first switching valve 13, the second switching valve 28, the turbine bypass valve 15, and the like.

FIG. 6(*a*) is a diagram for illustrating the steam reforming reaction in the three-way catalyst. The lines L1 to L3 shown in FIG. 6(*a*) respectively indicate a concentration of the hydrocarbon (specifically $C_3H_6$), a concentration of carbon dioxide, and a concentration of carbon monoxide in the exhaust gases. As apparent from FIG. 6(*a*), the steam reforming reaction is performed in the temperature range from 300 to 400 degrees Centigrade. Further, the lines L11 and L12 shown in FIG. 6(*b*) respectively indicate changes in the upstream side catalyst temperature TPTC and the downstream side catalyst temperature TATC, when the vehicle driven by the engine shown in FIG. 1 is running. The ratio of the time period during which the upstream side catalyst temperature TPTC is within the range from 300 to 400 degrees Centigrade is large, which indicates that the steam reforming reaction is accelerated in the upstream side catalyst 11. On the other hand, the downstream side catalyst temperature TATC hardly exceeds 300 degrees Centigrade. Accordingly, the steam reforming reaction is not performed in the downstream side catalyst 33. It is to be noted that changes in the upstream side catalyst temperature TPTC (L11) shown in FIG. 6(*b*) is mainly due to changes in the vehicle speed.

FIG. 2 is a flowchart of a process for controlling the first switching valve 13 and the turbine bypass valve 15. This process is executed at predetermined time intervals in the CPU of the ECU 4.

In step S11, it is determined whether or not the engine coolant temperature TW is higher than a predetermined water temperature TWX (e.g., 70 degrees Centigrade). If the answer to step S11 is negative (NO), it is determined whether or not the upstream side catalyst temperature TPTC is higher than a predetermined upstream side catalyst temperature TPTCX (e.g., 500 degrees Centigrade) (step S12). If the answer to step S12 is negative (NO), it is determined whether or not the recirculated exhaust gas temperature TEGR is higher than a predetermined exhaust gas temperature TEGRX (e.g., 400 degrees Centigrade) (step S13). If the answer to step S13 is negative (NO), it is determined whether or not the accelerator operation amount AP is equal to "0" and the engine rotational speed NE is greater than a predetermined idling rotational speed NEIDL (e.g., 800 rpm) (step S14).

If the answer to step S14 is negative (NO), i.e., when both of the upstream side catalyst temperature TPTC and the recirculated exhaust gas temperature TEGR are low before completion of the warming-up of the engine, and the accelerator pedal is depressed or the engine 1 is in the idling condition, the first switching valve 13 is adjusted to the bypass passage closed state (step S15). The exhaust gases are supplied to the turbine 9*a* and recirculated to the intake system through the upstream side catalyst 11. In this state, the unburnt fuel components burn in the upstream side catalyst 11 to raise the temperature of the exhaust gases, and the exhaust gases of the raised temperature are recirculated to the intake system. Consequently, the warming-up of the engine is accelerated and the unburnt fuel components are prevented from flowing into the exhaust gas recirculation passage 25, which makes it possible to avoid reduction of the effective cross section area of the exhaust gas recirculation passage 25 or sticking of the exhaust gas recirculation control valve 26.

On the other hand, if the answer to any one of steps S11 to S14 is affirmative (YES), i.e., if the warming-up of the engine is completed; the upstream side catalyst temperature TPTC is high; the recirculated exhaust gas temperature TEGR is high; or the accelerator operation amount AP is equal to "0" and the engine rotational speed NE is greater than the predetermined idling rotational speed NEIDL (when the engine 1 is decelerating), the first switching valve 13 is switched to the bypass valve open state (step S16). In this state, the exhaust gases bypass the upstream side catalyst 11 and are supplied to the turbine 9*a* and recirculated to the intake system. Accordingly, thermal deterioration and increase in the pressure loss of the upstream side catalyst 11 are suppressed, thereby preventing the recirculated exhaust gas temperature TEGR from excessively rising. Further, the exhaust gases of a low temperature is prevented from flowing into the upstream side catalyst 11 when the engine is decelerating, thereby preventing reduction in the upstream side catalyst temperature TPTC. It is to be noted that when the upstream side catalyst temperature TPTC is high, the downstream side catalyst 33 is normally activated and the exhaust gases are purified by the downstream side catalyst 33.

After execution of step S15 or S16, the process proceeds to step S17, in which it is determined whether or not the engine coolant temperature TW is higher than the predetermined water temperature TWX similarly to step S11. If the answer to step S17 is negative (NO), it is determined whether or not the downstream side catalyst temperature TATC is higher than a predetermined downstream side catalyst temperature TATCX (e.g., 300 degrees Centigrade) (step S18).

The answer to step S18 is negative (NO), i.e., when the warming-up of the engine is not completed and the downstream side catalyst temperature TATC is low, the turbine bypass valve 15 is opened (step S19). Accordingly, the exhaust gases bypass the turbine 9*a* and flow into the downstream side catalyst 33, which makes it possible to accelerate rising in the temperature of the downstream side catalyst 33, to activate the downstream side catalyst 33 earlier.

On the other hand, if the answer to step S17 or step S18 is affirmative (YES), i.e., when the warming-up is completed or the downstream side catalyst temperature TATC is high, the turbine bypass valve 15 is closed (step S20). Therefore, the turbocharger 9 can be normally operated.

In this embodiment, the first switching valve 13 corresponds to the catalyst bypass passage on/off valve, and the turbine bypass valve 15 corresponds to the turbine bypass passage on/off valve.

Second Embodiment

FIG. 3 is a schematic diagram showing a configuration of an engine according to a second embodiment of the present invention. The configuration shown in FIG. 3 is the same as the configuration shown in FIG. 1 except for the points described below. The engine shown in FIG. 3 is provided with an exhaust gas recirculation passage 31 for connecting the exhaust gas recirculation passage 25 of the engine shown in FIG. 1 and the upstream side of the upstream side catalyst 11 in the exhaust pipe 8. A third switching valve 32 is provided at the connecting portion of the exhaust gas recirculation passage 25 and the exhaust gas recirculation passage 31. In the following description, the downstream side of the exhaust gas recirculation passage 25 relative to the third switching valve 32 is referred to as "common exhaust gas recirculation passage 25*a*"; the upstream side of the exhaust gas recirculation passage 25 relative to the third switching valve 32 is referred to as "downstream connecting exhaust gas recirculation passage 25*b*"; and the exhaust gas recirculation passage 31 is referred to as "upstream connecting exhaust gas recirculation passage 31".

The third switching valve 32 is connected to the ECU 4, and the operation is controlled by the ECU 4. The third switching valve 32 is switched between a state of connecting the downstream connecting exhaust gas recirculation passage 25*b* and the common exhaust gas recirculation passage 25*a* to recirculate the exhaust gases to the intake system (hereinafter referred to as "downstream side recirculation state") and a state of connecting the upstream connecting exhaust gas recirculation passage 31 and the common exhaust gas recirculation passage 25*a* to recirculate the exhaust gases to the intake system (hereinafter referred to as "upstream side recirculation state").

FIG. 4 is a flowchart of a process for controlling the first switching valve 13, the third switching valve 32, and the turbine bypass valve 15. This process is executed at predetermined time intervals in the CPU of the ECU 4.

The process of FIG. 4 is obtained by deleting step S13 of the process of FIG. 2 and adding steps S13*a*, 13*b*, and 13*c*. Only differences between the processes of FIG. 4 and FIG. 2 are described below.

If the answer to step S14 is negative (NO), i.e., when the accelerator pedal is depressed and the warming-up of the engine is not completed, or when the engine is in the idling condition, the first switching valve 13 is switched to the bypass passage closed state (step S15), and it is determined whether or not the recirculated exhaust gas temperature TEGR is higher than the predetermined exhaust gas temperature TEGRX (step S13*a*). If the answer to step S13*a* is affirmative (YES), i.e., when the recirculated exhaust gas temperature TEGR is higher than the predetermined exhaust gas temperature TEGRX, the third switching valve 32 is switched to the upstream side recirculation state (step S13*b*). Further, if TEGR is equal to or less than TEGRX in step S13*a*, the third switching valve 32 is switched to the downstream side recirculation state (step S13*c*).

On the other hand, if the answer to any one of steps S11, S12, and S14 is affirmative (YES), i.e., when the warming-up of the engine is completed; the upstream side catalyst temperature TPTC is high; or the accelerator operation amount AP is equal to "0" and the engine rotational speed NE is greater than the predetermined idling rotational speed NEIDL, the first switching valve 13 is switched to the bypass valve open state (step S16), to make the exhaust gases bypass the upstream side catalyst 11 and be supplied to the turbine 9*a*. Then, the third switching valve 32 is switched to the downstream side recirculation state.

According to the process of FIG. 4, when the engine temperature is low (when the warming-up is not completed and both of the upstream side catalyst temperature TPTC and the recirculated exhaust gas temperature TEGR are low), the first switching valve 13 is switched to the bypass passage closed state and the third switching valve 32 is switched to the downstream side recirculation state. Consequently, the exhaust gases discharged from the engine pass through the upstream side catalyst 11, and a part of the exhaust gases discharged from the upstream side catalyst 11 is recirculated through the common exhaust gas recirculation passage 25*a* to the intake system. The first switching valve 13 is switched to the bypass passage closed state before completion of the warming-up of the engine. Therefore, the unburnt fuel components burn in the upstream side catalyst to raise the temperature of the exhaust gases, and the exhaust gases of the raised temperature is recirculated through the first exhaust gas recirculation passage to the intake system. Consequently, the warming-up of the engine is accelerated and the unburnt fuel components are prevented from flowing into the exhaust gas recirculation passages 25*a* or 25*b*, which makes it possible to avoid reduction of the effective cross section area of the exhaust gas recirculation passage 25*a* or 25*b*, or sticking of the exhaust gas recirculation control valve 26. Further, when the first switching valve 13 is switched to the bypass passage closed state, and the recirculated exhaust gas temperature TEGR exceeds the predetermined exhaust gas temperature TEGRX, the third switching valve 32 is switched to the upstream side recirculation state, thereby preventing the recirculated exhaust gas temperature TEGR from excessively rising while purifying the exhaust gases with the upstream side catalyst 11.

In this embodiment, the third switching valve 32 corresponds to the switching valve, the common exhaust gas recirculation passage 25*a* and the downstream connecting exhaust gas recirculation passage 25*b* correspond to the first exhaust gas recirculation passage, and the upstream connecting exhaust gas recirculation passage 31 and the downstream connecting exhaust gas recirculation passage 25*b* correspond to the second exhaust gas recirculation passage.

Third Embodiment

FIG. 7 is a schematic diagram showing a configuration of an internal combustion engine and a control system therefor according to a third embodiment of the present invention. The configuration shown in FIG. 7 is obtained by providing a lean NOx catalyst 35 downstream of the DPF 34 in the exhaust pipe 8 in the configuration shown in FIG. 3. This embodiment is the same as the second embodiment except for this point.

By providing the lean NOx catalyst 35 downstream of the DPF34, the thermal deterioration of the lean NOx catalyst 35 can be suppressed and the temperature of the DPF 34 can be raised earlier when performing the regeneration process of the DPF34.

The present invention is not limited to the embodiments described above, and various modifications may be made. For example, step S12 of the process of FIG. 2 may be replaced with step S12*a* as shown in FIG. 5. In step S12*a*, it is determined whether or not the downstream side catalyst temperature TATC is higher than the predetermined downstream side catalyst temperature TATCX. If the answer to step S12*a* is affirmative (YES), the process proceeds to step S16. If the answer to step S12*a* is negative (NO), the process proceeds to step S13.

When the downstream side catalyst temperature TATC is higher than the predetermined downstream side catalyst temperature TATCX, the upstream side catalyst temperature TPTC is normally higher than the predetermined upstream side catalyst temperature TPTCX. Accordingly, the same effect as that of the first embodiment can be obtained. It is to be noted that step S12 of the process of FIG. 4 in the second embodiment may be similarly replaced with step S12*a*.

Further, in the process of FIG. 4, steps S12 and S14 may be deleted, and the first switching valve 13 may be switched to the bypass passage closed state when the engine coolant temperature TW is equal to or less than the predetermined temperature TWX. Alternatively, in the process of FIG. 4, steps S11 and S14 may be deleted, and the first switching valve 13 may be switched to the bypass passage closed state when the upstream side catalyst temperature TPTC is equal to or less than the predetermined upstream side catalyst temperature TPTCX.

INDUSTRIAL APPLICABILITY

The present invention can be applied also to a gasoline internal combustion engine and a control system therefor, in addition to the above-described diesel internal combustion engine. Further, the present invention can be applied also to a watercraft propulsion engine such as an outboard engine having a vertically extending crankshaft and to a control for such engine.

The invention claimed is:

1. An internal combustion engine having a turbocharger, comprising:

a turbine of said turbocharger located in an exhaust system of said engine;

an upstream side catalyst located upstream of said turbine;

a catalyst bypass passage bypassing said upstream side catalyst;

a catalyst bypass passage on/off valve for opening and closing said catalyst bypass passage; and an exhaust gas recirculation passage for recirculating a part of exhaust gases from a portion between said upstream side catalyst and said turbine to an intake system of said engine, wherein said catalyst bypass passage is disposed between an upstream side of said upstream side catalyst and an upstream side of a connecting portion between said exhaust gas recirculation passage and said exhaust system.

2. An internal combustion engine having a turbocharger, comprising:

a turbine of said turbocharger located in an exhaust system of said engine;

an upstream side catalyst located upstream of said turbine;

a catalyst bypass passage bypassing said upstream side catalyst;

a catalyst bypass passage on/off valve for opening and closing said catalyst bypass passage;

a first exhaust gas recirculation passage for recirculating a part of exhaust gases from a portion between said upstream side catalyst and said turbine to an intake system of said engine;

a second exhaust gas recirculation passage for recirculating a part of exhaust gases from an upstream side of said upstream side catalyst to said intake system; and a switching valve for switching between said first exhaust recirculation passage and said second exhaust recirculation passage, wherein said catalyst bypass passage is disposed between an upstream side of said upstream side catalyst and an upstream side of a connecting portion between said first exhaust gas recirculation passage and said exhaust system.

3. An internal combustion engine according to claim 1, further including a downstream side catalyst disposed downstream of said turbine.

4. An internal combustion engine according to claim 3, further including a turbine bypass passage bypassing said turbine, and a turbine bypass passage on/off valve for opening and closing said turbine bypass passage, wherein said downstream side catalyst is located downstream of a portion at which said exhaust passage is connected to said turbine bypass passage downstream of said turbine.

5. An internal combustion engine according to claim 3, further including a particulate filter disposed downstream of said downstream side catalyst.

6. An internal combustion engine according to claim 5, further including a lean NOx catalyst disposed downstream of said particulate filter.

7. An internal combustion engine according to claim 3, wherein said downstream side catalyst is a three-way catalyst added with a NOx trapping agent, or an oxidation catalyst added with a hydrocarbon adsorbent.

8. An internal combustion engine according to claim 1, wherein said upstream side catalyst is any one of an oxidation catalyst added with a hydrocarbon adsorbent, a three-way catalyst added with a NOx trapping agent, and a three-way catalyst added with a NOx trapping agent and a hydrocarbon adsorbent.

9. An internal combustion engine according to claim 7, wherein said NOx trapping agent is ceria, and said hydrocarbon adsorbent is zeolite.

10. An internal combustion engine according to claim 1, wherein a control system closes said catalyst bypass passage on/off valve when a temperature of said engine is low.

11. An internal combustion engine according to claim 1, wherein a control system closes said catalyst bypass passage on/off valve when a temperature of said upstream side catalyst is equal to or less than a predetermined catalyst temperature.

12. An internal combustion engine according to claim 1, wherein a control system opens said catalyst bypass passage on/off valve when said engine is decelerating.

13. An internal combustion engine according to claim 2, further including a downstream side catalyst disposed downstream of said turbine.

14. An internal combustion engine according to claim 2, wherein said upstream side catalyst is any one of an oxidation catalyst added with a hydrocarbon adsorbent, a three-way catalyst added with a NOx trapping agent, and a three-way catalyst added with a NOx trapping agent and a hydrocarbon adsorbent.

15. An internal combustion engine according to claim 2, wherein a control system closes said catalyst bypass passage on/off valve when a temperature of said engine is low.

16. An internal combustion engine according to claim 2, wherein a control system closes said catalyst bypass passage on/off valve when a temperature of said upstream side catalyst is equal to or less than a predetermined catalyst temperature.

17. An internal combustion engine according to claim 2, wherein a control system opens said catalyst bypass passage on/off valve when said engine is decelerating.

18. A control system for an internal combustion engine having a turbocharger, wherein said internal combustion engine includes:

a turbine of said turbocharger located in an exhaust system of said engine;

an upstream side catalyst located upstream of said turbine;

a catalyst bypass passage bypassing said upstream side catalyst;

a catalyst bypass passage on/off valve for opening and closing said catalyst bypass passage;

a first exhaust gas recirculation passage for recirculating a part of exhaust gases from a portion between said upstream side catalyst and said turbine to an intake system of said engine;

a second exhaust gas recirculation passage for recirculating a part of exhaust gases from an upstream side of said upstream side catalyst to said intake system; and a switching valve for switching between said first exhaust recirculation passage and said second exhaust recirculation passage, wherein said catalyst bypass passage is disposed between an upstream side of said upstream side catalyst and an upstream side of a connecting portion between said exhaust gas recirculation passage and said exhaust system, wherein said control system closes said catalyst bypass passage on/off valve and switches said switching valve to a state of connecting said first exhaust recirculation passage when a temperature of said engine is low, and wherein if a temperature of exhaust gases recirculated through said first exhaust recirculation passage exceeds a predetermined exhaust gas temperature, said control system switches said switching valve to the other state of connecting said second exhaust recirculation passage.

* * * * *